United States Patent
Maple et al.

(10) Patent No.: US 12,356,028 B2
(45) Date of Patent: Jul. 8, 2025

(54) REDACTING INFORMATION IN VIDEO STREAMS

(71) Applicant: International Business Machines Corporation, Armonk, NY (US)

(72) Inventors: Elizabeth Jane Maple, Basingstoke (GB); Shivani Coleman, Southampton (GB); Adam John Gibbons, Oxford (GB)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 18/512,160

(22) Filed: Nov. 17, 2023

(65) Prior Publication Data
US 2025/0126308 A1   Apr. 17, 2025

(30) Foreign Application Priority Data
Oct. 12, 2023   (GB) ...................... 2315632

(51) Int. Cl.
*H04N 21/2365* (2011.01)
*H04N 21/234* (2011.01)
*H04N 21/235* (2011.01)
*H04N 21/258* (2011.01)

(52) U.S. Cl.
CPC ... *H04N 21/2365* (2013.01); *H04N 21/23418* (2013.01); *H04N 21/2353* (2013.01); *H04N 21/25816* (2013.01)

(58) Field of Classification Search
CPC ......... H04N 21/2365; H04N 21/23418; H04N 21/2358; H04N 21/25816
See application file for complete search history.

(56) References Cited

U.S. PATENT DOCUMENTS

| | | | |
|---|---|---|---|
| 10,476,922 B2 | 11/2019 | Edwards | |
| 11,082,731 B1 | 8/2021 | Cox | |
| 11,349,841 B2 | 5/2022 | Bowie et al. | |
| 11,489,818 B2 | 11/2022 | Werner et al. | |
| 11,803,661 B1 * | 10/2023 | Sutherland | ............ G06F 40/169 |

(Continued)

FOREIGN PATENT DOCUMENTS

GB   2634544 A   4/2025

OTHER PUBLICATIONS

Aldredge, Jourdan, "Become an overlay all-star: how to master video overlays for your edits", VIMEO, Apr. 26, 2022, 9 pages, <https://vimeo.com/blog/post/video-overlay-guide/>.

(Continued)

*Primary Examiner* — Mulugeta Mengesha
(74) *Attorney, Agent, or Firm* — Anthony M. Pallone (57) ABSTRACT

A method, computer program product, and computer system for redacting information in a video stream. The method includes accessing content of an original video stream and classifying sensitive data within the original video stream as classified data components of one or more of multiple permission categories. The method provides sub-streams of the classified data components for one or more permission categories. The method redacts the classified data components in the original video stream and combines the redacted video stream with one or more of the sub-streams to output a combined video stream depending on the access permissions of an endpoint.

18 Claims, 4 Drawing Sheets

(56) References Cited

U.S. PATENT DOCUMENTS

| | | | |
|---|---|---|---|
| 2013/0007123 A1* | 1/2013 | Crosbie | H04L 63/107 709/204 |
| 2021/0194888 A1* | 6/2021 | Bhaskar S | G06F 16/3347 |
| 2022/0245288 A1 | 8/2022 | Anderson | |
| 2023/0041623 A1 | 2/2023 | Harris et al. | |
| 2023/0119561 A1 | 4/2023 | Fredrik | |

OTHER PUBLICATIONS

Anonymous, "Method for easing the sharing of document with sensitive content in a video conference", An IP.com Prior Art Database Technical Disclosure, IP.com No. IPCOM000261292D. IP.com Electronic Publication Date: Feb. 18, 2020, 4 pages.

Brookes, Tim, "How to Share Your Screen Without Revealing Private Information", How-To Geek, Published Mar. 24, 2020, 16 pages, <https://www.howtogeek.com/661908/how-to-share-your-screen-without-revealing-private-information/>.

* cited by examiner

FIG. 4

REDACTING INFORMATION IN VIDEO STREAMS

BACKGROUND

The present invention relates to redacting information in data security, and more specifically, to redacting information in video streams.

While applications have increasing levels of security and data protection in the current day, screen sharing remains vulnerable to security breaches. Screen sharing during presentations or video calls via video call platforms relies on the user to take manual precautions for data security. The same issue is also present with remote desktops and any other way of streaming video.

When screen sharing, it is currently difficult to separate and hide elements from an application or page that should only be seen by certain participants. Although existing technology may allow you to share only certain aspects of screen or hide password fields, it is not sophisticated enough to automatically hide sensitive data from specific participants. This means users may accidentally share information that should only be visible by certain individuals.

SUMMARY

According to an aspect of the present invention there is provided a computer-implemented method for redacting information in a video stream, said method comprising: accessing content of an original video stream; classifying sensitive data within the original video stream as classified data components of one or more of multiple permission categories; providing sub-streams of the classified data components for one or more permission categories; redacting the classified data components in the original video stream; and combining the redacted video stream with one or more of the sub-streams to output a combined video stream depending on the access permissions of an endpoint.

The method for redacting the information has the advantage of being adaptable to access permissions of the endpoints such that a video stream can include different categories of sensitive information for different categories of viewers. Based on the access permissions of the viewing users at the endpoints, each endpoint gets the main stream in addition to any sub-streams of additional content that they have the permissions required to access.

According to another aspect of the present invention there is provided a system for redacting information in a video stream, comprising: a processor and a memory configured to provide computer program instructions to the processor to execute the function of the components: an original video stream accessing component for accessing content of an original video stream; a classifying component for classifying sensitive data within the original video stream as classified data components of one or more of multiple permission categories; a sub-stream component for providing sub-streams of the classified data components for one or more permission categories; a redacting component for redacting the classified data components in the original video stream; and an output component for combining the redacted video stream with one or more of the sub-streams to output a combined video stream depending on the access permissions of an endpoint.

According to a further aspect of the present invention there is provided a computer program product for redacting information in a video stream, the computer program product comprising a computer readable storage medium having program instructions embodied therewith, the program instructions executable by a processor to cause the processor to: access content of an original video stream; classify sensitive data within the original video stream as classified data components of one or more of multiple permission categories; provide sub-streams of the classified data components for one or more permission categories; redact the classified data components in the original video stream; and combine the redacted video stream with one or more of the sub-streams to output a combined video stream depending on the access permissions of an endpoint.

The computer readable storage medium may be a non-transitory computer readable storage medium and the computer readable program code may be executable by a processing circuit.

BRIEF DESCRIPTION OF THE DRAWINGS

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product for redacting information in a video stream are provided. The described method accesses content of an original video stream and classifies sensitive data within the video stream in order to redact data components of the video stream including the sensitive data. The redacted data components are classified according to permission categories and displayed at an endpoint depending on access permissions of the endpoint.

The redaction of information in a video stream is an improvement in the technical field of computer security generally and more particularly in the technical field of controlling access to data.

The described method and system propose securing particular data components of a video stream based on the receiving endpoints. The endpoints may be individual users or groups of users with one or more permission categories.

Figure 1:
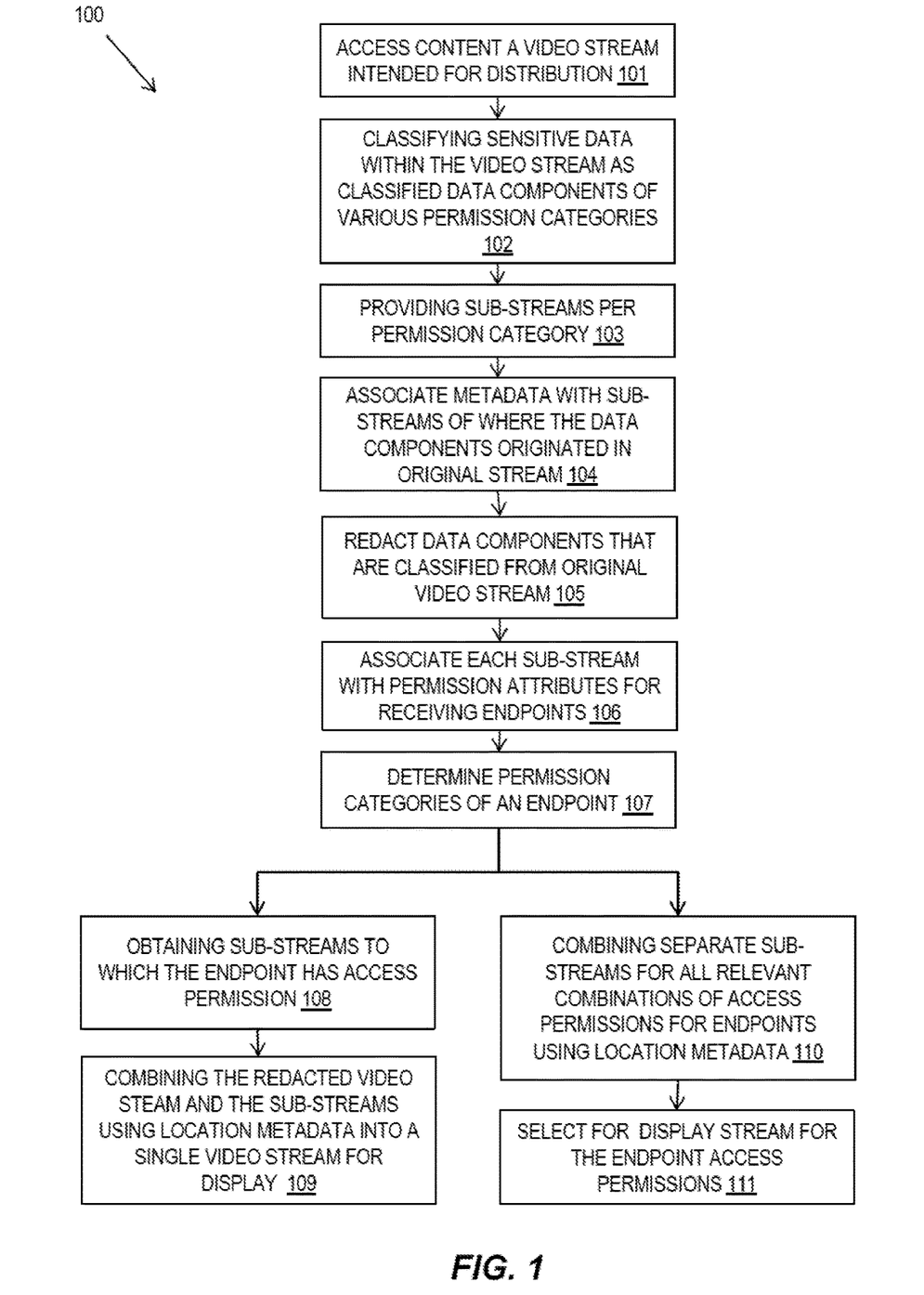
FIG. 1 is a flow diagram of an example embodiment of a method in accordance with embodiments of the present invention.

Referring to FIG. 1, a flow diagram 100 shows an example embodiment of a computer-implemented method for redacting information in a video stream.

The method includes accessing 101 content of an original video stream. An original video stream may be intercepted and captured that is intended for distribution. The original video stream may be from a video conferencing system or other form of video streaming in which sensitive data may be included.

The method may classify 102 sensitive data within the original video stream as classified data components of one or more of multiple permission categories. Classification may be carried out using one or more of the group of: password field detection, image recognition, manual labeling, application programming interface (API) connections, etc. The classification may be constantly running against the content being streamed to identify potentially confidential data and classify it accordingly.

The method may include providing 103 sub-streams of the classified data components for one or more permission categories. The sub-streams may include classified data components of the original video stream copied into independent streams. Individual sub-streams may be provided for each category of access permissions. Alternatively, sub-streams may be provided for different combinations of permission categories.

The sub-streams of video data include the allowed data components for the one or more permission categories and location information of the allowed data components in the original video stream. This may include associating 104 metadata with a sub-stream to embed locations of the data components in the original video stream.

The method may redact 105 the classified data components in the original video stream. The redacting may be carried out by replacing the sensitive data by a block box or a void area at the position of the sensitive data in the video stream. In this way the original video stream has no sensitive data displayed and the sub-streams have differing amounts of sensitive data depending on the access permission categories catered for by the sub-streams.

The method may include associating 106 each sub-stream with permission attributes. Each classified sub-stream has permission attributes associated to identify the types of endpoints that can and cannot view it.

One or more permission categories of an endpoint may be determined 107 and compared to the sub-stream permission attributes. The permission categories of endpoints may be based on the access permissions of the viewing users at endpoints. For example, this may use LDAP, Active Directory (AD) or account data of the viewing users.

The method may combine the redacted video stream with one or more of the sub-streams to output a combined video stream depending on the access permissions of an endpoint. The sub-streams may be overlaid on the redacted video stream by using video overlay techniques to position and style an overlay within a video. This may be carried out in different ways as explained below.

In one embodiment, combining the redacted video stream with one or more of the sub-streams to output a combined video stream depending on the access permissions of an endpoint may include individually combining the sub-streams for an endpoint. This may include obtaining 108 sub-streams for the permission categories of the endpoint. The method may combine 109 the redacted video stream with the obtained sub-streams to re-constitute combined streams using the location metadata of the sub-streams to output a single video stream for display.

In another embodiment, the method may include combining 110 the redacted video stream with combinations of obtained sub-streams for different permission category combinations for use by multiple endpoints. In this embodiment, the method may determine one or more permission categories of an endpoint and may select for display 111 the combination of redacted video stream and sub-streams suitable for the permission categories of the endpoint.

The method may capture real-time video stream for distribution from a presenter and dynamically output a combined video stream for an endpoint depending on the access permissions of the endpoint. Real-time editing of videos may be carried out using editing tools from streaming platforms allowing changes to be made whilst the streaming is live. This may use the overlay editing using the location metadata for the sub-streams. Location metadata may be collected and sent alongside the redacted video stream for combining into the final display stream for the given permission categories of the endpoint.

The method analyzes the content of the video stream from a presenter, separates this content into separate sub-streams. The method sends a redacted version of the original stream to those who do not have permissions to see certain parts of the stream, whilst sending a complete version of the stream to anyone with full permission. Intermediate positions occur when endpoint users have one or more permissions.

The main benefit of this solution is that the presenter does not need to worry about what data are being shared with which participants. The described method may be incorporated into existing Role-Based Access Control (RBAC) security systems (e.g., Lightweight Directory Access Protocol (LDAP), Active Directory, etc.) inside the server.

Based on the access permissions of the viewing users at the endpoints, each endpoint gets the main stream in addition to any sub-streams they have the permissions required to access.

The endpoint devices may reconstitute the streams using the embedded location information in the sub-streams into a single video for display. In an alternative implementation, a streaming server reconstitutes the separate streams into all relevant combinations of permissions and distributes multiple finished streams based upon permissions as opposed to the separate parts.

Figure 2:
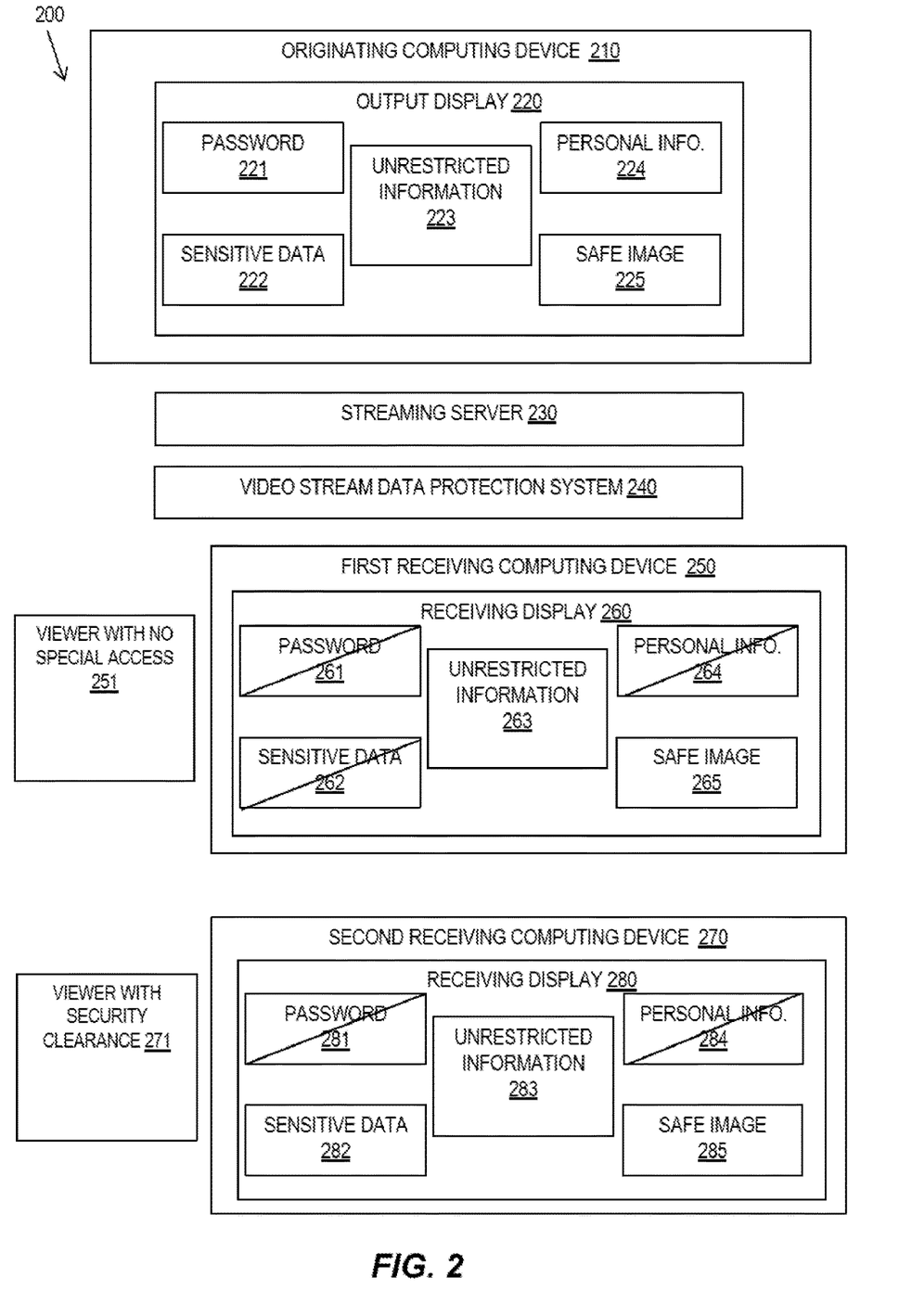
FIG. 2 is a block diagram of an example embodiment of a system in accordance with embodiments of the present invention.

Referring to FIG. 2, a block diagram shows an example embodiment of a system 200 for redacting information in a video stream.

The system 200 includes an originating computing device 210 showing an output display 220 having various data components 221-225 displayed. This is a schematic representation to show video stream data components that my last for a short duration of time in at a time and place location in the video stream. In this example, the data components 221-225 may include a password 221, some sensitive data 222, some unrestricted information 223, some personal information 224, and a safe image 225. A streaming server 230 may stream the video stream to receiving computing devices 250, 270 over a network.

The described system provides a video stream data protection system 240. This may be incorporated into a streaming server 230 or may be provided separately. The video stream data protection system 240 provides redacted video streams in which the original video stream has sensitive data redacted in combination with sub-streams of the redacted data components that a viewer at the endpoints has permission to access.

In the example of FIG. 2, a viewer with no special access 251 is shown at the endpoint of a first receiving computing device 250. The receiving display 260 has the password 261, sensitive data 262, and personal information 264 redacted and therefore not visible to the viewer 251. The unrestricted information 263 and the safe image 265 are shown.

A viewer with security clearance 271 is shown at the endpoint of a second receiving computing device 270. The receiving display 280 has the password 281 and personal information 284 still redacted. However, the sensitive data 282 is shown as there is access permission for this category of data component. The unrestricted information 283 and the safe image 285 are also shown.

Another viewer, not shown in the Figure, may have data protection clearance, for example, for European General Data Protection Regulation (GDPR) clearance. The receiving display would then display the personal information in addition to the unrestricted information and the safe image.

Figure 3:
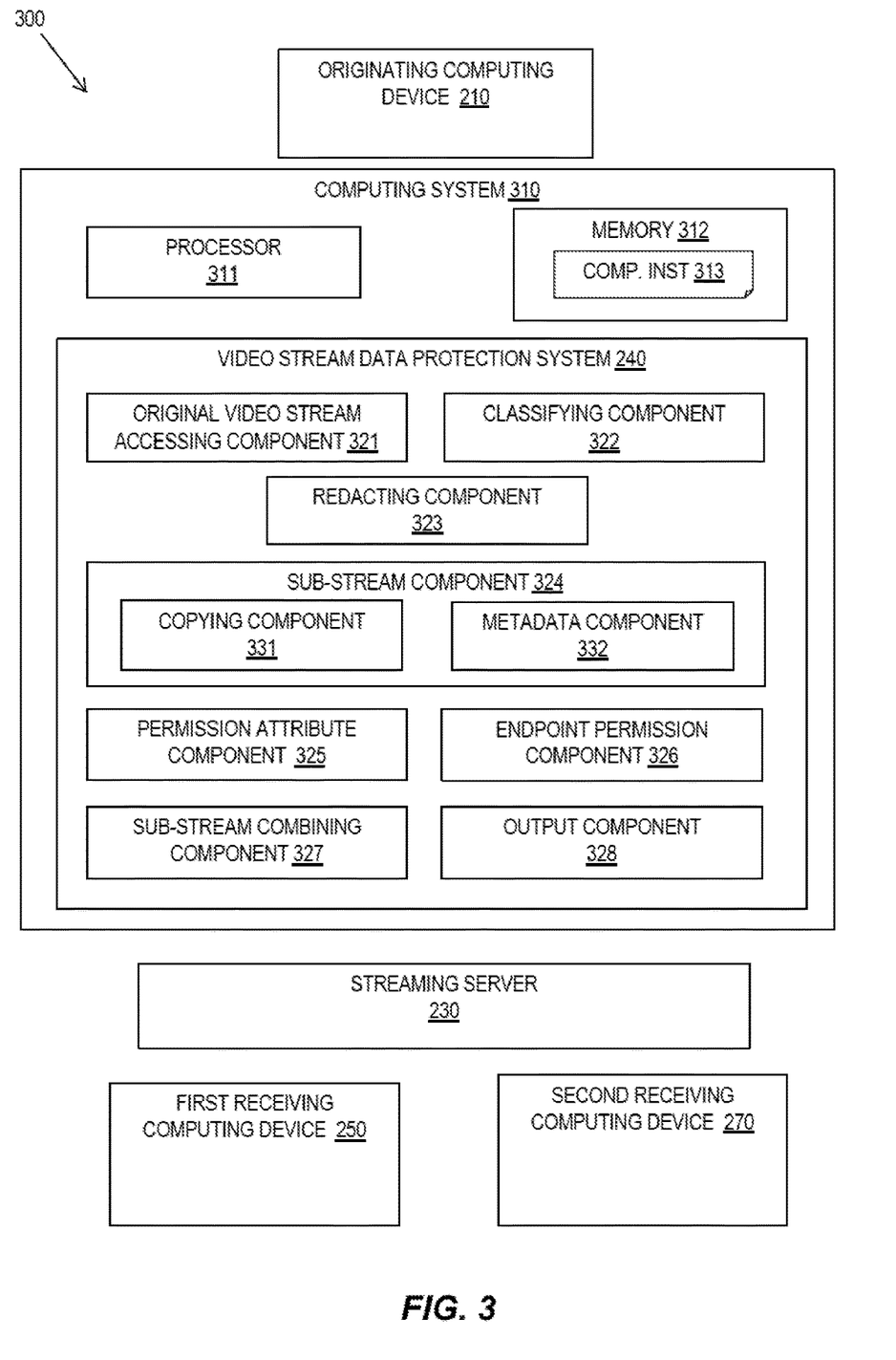
FIG. 3 is a block diagram of an example embodiment of a system in accordance with embodiments of the present invention.

Referring to FIG. 3, a block diagram 300 shows the system of FIG. 2, with additional components of the video stream data protection system 240.

A computing system 310 is provided on which the video stream data protection system 240 is implemented. The computing system 310 may include at least one processor 311, a hardware module, or a circuit for executing the functions of the described components which may be software units executing on the at least one processor. Multiple processors running parallel processing threads may be provided enabling parallel processing of some or all of the functions of the components. Memory 312 may be configured to provide computer instructions 313 to the at least one processor 311 to carry out the functionality of the components.

The video stream data protection system 240 may include an original video stream accessing component 321 for accessing content of an original video stream and a classifying component 322 for classifying sensitive data within the original video stream as classified data components of one or more of multiple permission categories. The video stream data protection system 240 may include a redacting component 323 for redacting the classified data components in the original video stream.

The video stream data protection system 240 may include a sub-stream component 324 for providing sub-streams of the classified data components for one or more permission categories.

The sub-stream component 324 may provide sub-streams of video data including the allowed data components for the one or more permission categories and location information of the allowed data components in the original video stream. The sub-stream component 324 includes a copying component 331 for copying classified data components into independent sub-streams per permission category.

The sub-stream component 324 may include a metadata component 332 for associating metadata with a sub-stream to embed locations of the data components in the original video stream.

The video stream data protection system 240 may include a permission attribute component 325 for associating each sub-stream with permission attributes. The video stream data protection system 240 may include an endpoint permission component 326 for determining one or more permission categories of an endpoint and comparing to the sub-stream permission attributes.

The video stream data protection system 240 may include a sub-stream combining component 327 for combining the redacted video stream with combinations of obtained sub-streams for different permission category combinations for use by multiple endpoints.

The video stream data protection system 240 may include an output component 328 for combining the redacted video stream with one or more of the sub-streams to output a combined video stream depending on the access permissions of an endpoint.

In one embodiment, the output component 328 includes: determining one or more permission categories of an endpoint; obtaining sub-streams for the permission categories of the endpoint; and combining the redacted video stream with the obtained sub-streams.

In another embodiment, the output component 328 includes: determining one or more permission categories of an endpoint; and selecting the combination of redacted video stream and sub-streams suitable for the permission categories of the endpoint from combined streams of the sub-stream combining component 327.

The original video stream accessing component 321 may include a real-time capturing component for capturing video stream for distribution from a presenter; and the output component 328 may include a dynamic output component for dynamically outputting a combined video stream for an endpoint depending on the access permissions of the endpoint.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
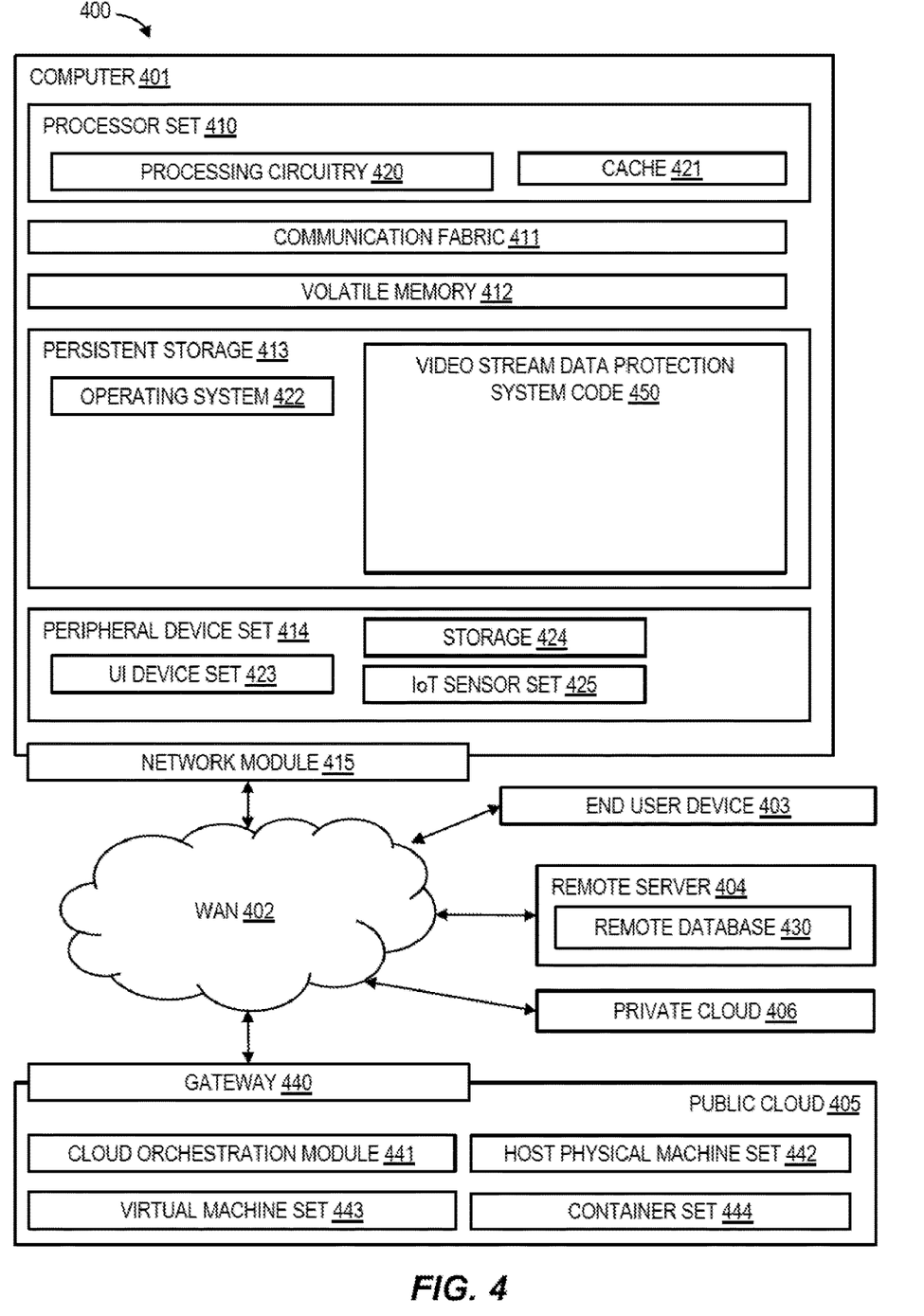
FIG. 4 is a block diagram of an example embodiment of a computing environment for the execution of at least some of the computer code involved in performing the present invention.

Referring to FIG. 4, computing environment 400 contains an example of an environment for the execution of at least some of the computer code involved in performing the inventive methods, such as video stream data protection system code 450. In addition to block 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 450 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 450 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for redacting information in a video stream, said method comprising:
   accessing content of an original video stream;
   classifying sensitive data within the original video stream as classified data components of one or more of multiple permission categories;
   providing sub-streams of the classified data components for one or more permission categories, wherein providing sub-streams for one or more permission categories includes sub-streams of video data including the allowed data components for the one or more permission categories and location information of the allowed data components in the original video stream;
   redacting the classified data components in the original video stream; and
   combining the redacted video stream with one or more of the sub-streams to output a combined video stream depending on the access permissions of an endpoint.

2. The method of claim 1, including associating metadata with a sub-stream to embed locations of the data components in the original video stream.

3. The method of claim 1, including copying classified data components into independent sub-streams per permission category.

4. The method of claim 1, including associating each sub-stream with permission attributes.

5. The method of claim 4, including determining one or more permission categories of an endpoint and comparing to the sub-stream permission attributes.

6. The method of claim 1, wherein combining the redacted video stream with one or more of the sub-streams to output a combined video stream depending on the access permissions of an endpoint includes:
   determining one or more permission categories of an endpoint;
   obtaining sub-streams for the permission categories of the endpoint; and
   combining the redacted video stream with the obtained sub-streams.

7. The method of claim 1, including combining the redacted video stream with combinations of obtained sub-streams for different permission category combinations for use by multiple endpoints.

8. The method of claim 7, wherein combining the redacted video stream with one or more of the sub-streams to output a combined video stream depending on the access permissions of an endpoint includes:
   determining one or more permission categories of an endpoint; and
   selecting the combination of redacted video stream and sub-streams suitable for the permission categories of the endpoint.

9. The method of claim 1, including:
   capturing video stream for distribution from a presenter; and
   dynamically outputting a combined video stream for an endpoint depending on the access permissions of the endpoint.

10. A system for redacting information in a video stream, comprising:
    a processor and a memory configured to provide computer program instructions to the processor to execute the function of the components:
    an original video stream accessing component for accessing content of an original video stream;
    a classifying component for classifying sensitive data within the original video stream as classified data components of one or more of multiple permission categories;
    a sub-stream component for providing sub-streams of the classified data components for one or more permission categories, wherein the sub-stream component provides sub-streams of video data including the allowed data components for the one or more permission categories and location information of the allowed data components in the original video stream;
    a redacting component for redacting the classified data components in the original video stream; and
    an output component for combining the redacted video stream with one or more of the sub-streams to output a combined video stream depending on the access permissions of an endpoint.

11. The system of claim 10, including a metadata component for associating metadata with a sub-stream to embed locations of the data components in the original video stream.

12. The system of claim 10, wherein the sub-stream component includes a copying component for copying classified data components into independent sub-streams per permission category.

13. The system of claim 10, including a permission attribute component for associating each sub-stream with permission attributes.

14. The system as claimed in claim 13, including an endpoint permission component for determining one or more permission categories of an endpoint and comparing to the sub-stream permission attributes.

15. The system of claim 10, including a sub-stream combining component for combining the redacted video stream with combinations of obtained sub-streams for different permission category combinations for use by multiple endpoints.

16. The system of claim 10, including:
    a real-time capturing component for capturing video stream for distribution from a presenter; and
    a dynamic output component for dynamically outputting a combined video stream for an endpoint depending on the access permissions of the endpoint.

17. The system of claim 10, wherein the system is incorporated at a streaming server.

18. A computer program stored on a computer readable medium and loadable into the internal memory of a digital computer, comprising software code portions, when said program is run on a computer, for performing the method steps of:
    accessing content of an original video stream;
    classifying sensitive data within the original video stream as classified data components of one or more of multiple permission categories;
    providing sub-streams of the classified data components for one or more permission categories, wherein providing sub-streams for one or more permission categories includes sub-streams of video data including the allowed data components for the one or more permission categories and location information of the allowed data components in the original video stream;
    redacting the classified data components in the original video stream; and combining the redacted video stream with one or more of the sub-streams to output a combined video stream depending on the access permissions of an endpoint.

\* \* \* \* \*